(12) United States Patent
Weir

(10) Patent No.: US 11,354,845 B1
(45) Date of Patent: Jun. 7, 2022

(54) MULTI-LOCATION DISC JOCKEY

(71) Applicant: Royal Caribbean Cruises Ltd., Miami, FL (US)

(72) Inventor: Nicholas Weir, Miami, FL (US)

(73) Assignee: ROYAL CARIBBEAN CRUISES LTD., Miami, FL (US)

( * ) Notice: Subject to any disclaimer, the term of this patent is extended or adjusted under 35 U.S.C. 154(b) by 0 days.

(21) Appl. No.: 17/336,256

(22) Filed: Jun. 1, 2021

(51) Int. Cl.
  *G06T 19/20* (2011.01)
  *G06T 13/40* (2011.01)
  *G06T 13/80* (2011.01)

(52) U.S. Cl.
  CPC .............. *G06T 13/40* (2013.01); *G06T 13/80* (2013.01); *G06T 19/20* (2013.01); *G06T 2219/2004* (2013.01)

(58) Field of Classification Search
  None
  See application file for complete search history.

(56) References Cited

U.S. PATENT DOCUMENTS

| | | | |
|---|---|---|---|
| 11,100,695 B1* | 8/2021 | O'Hagan | G06F 3/011 |
| 2014/0306866 A1* | 10/2014 | Miller | H04L 67/38 345/8 |
| 2017/0076505 A1* | 3/2017 | Gavriliuc | H04L 51/32 |
| 2017/0105081 A1* | 4/2017 | Jin | G06F 16/4393 |
| 2017/0206691 A1* | 7/2017 | Harrises | G02B 27/0172 |
| 2018/0047200 A1* | 2/2018 | O'Hara | G06T 3/40 |

* cited by examiner

*Primary Examiner* — Vu Nguyen
(74) *Attorney, Agent, or Firm* — CRGO Global; Steven M. Greenberg

(57) ABSTRACT

A method for multi-location DJ presence management includes generating an avatar image corresponding to a DJ operating a DJ console at a primary location on a vessel and transmitting from the DJ console, an audio feed produced by the DJ console to multiple other locations on the vessel. The avatar then can be displayed at each of the other locations. Finally, the displayed can be animated in coordination with movements of the DJ operating the DJ console. In this way, irrespective of the location of a member of the audience in any of the locations, the member of the audience can experience the live performance of the DJ as if the DJ were present in person at the location of the member of the audience.

15 Claims, 3 Drawing Sheets

MULTI-LOCATION DISC JOCKEY

BACKGROUND OF THE INVENTION

Field of the Invention

The present invention relates to the technical field of disc jockey (DJ) performance coordination and more particularly to multi-room reception of DJ performance audio and video.

Description of the Related Art

The venerable DJ has formed part and parcel of the live social entertainment venue since the dawn of recordable music. Historically, the DJ selects a playlist of music and sequentially plays back each song in the playlist through a DJ console so that the music may be amplified through loudspeakers proximate to the console. Through the course of playing the playlist, the DJ may engage in dialog with the audience and the DJ may also dance along with the audience. Like any other musical performance, the ability to experience the performance of a DJ rests with the co-location of the audience with the DJ and the DJ console.

The performance of a DJ oftentimes can be amateur—a hobby of the performer. But, in many instances, the DJ is a professional and therefore, compensated financially by an employer or customer, as the case may be. Like any other musical act, a good DJ can be expensive. For a captive venue of a single location such as a night club or restaurant, so much is expected. But for a larger venue such as a hotel and especially for a cruise ship, where there are many locations requiring entertainment, employing multiple DJs can be very expensive. Of course, as is the case in a multi-room night club, it remains possible to simulcast live video in one location of a venue onto to display screens of other locations of the same venue. But in doing so, aside from the guests in the primary location of the venue, there is no immersion into the performance of the DJ as the other guests in the other rooms of the venue simply view the performance on a television monitor.

BRIEF SUMMARY OF THE INVENTION

Embodiments of the present invention address technical deficiencies of the art in respect to the multi-room reception of DJ performance audio and video. To that end, embodiments of the present invention provide for a novel and non-obvious method for multi-location DJ presence management. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In one embodiment of the invention, a method for multi-location DJ presence management includes generating an avatar image corresponding to a DJ operating a DJ console at a primary location on a vessel, or optionally at a location external to the vessel, and transmitting from the DJ console, an audio feed produced by the DJ console to multiple other locations on the vessel. The avatar then can be displayed at each of the other locations. Finally, the displayed can be animated in coordination with movements of the DJ operating the DJ console. In this way, irrespective of the location of a member of the audience in any of the locations, the member of the audience can experience the live performance of the DJ as if the DJ were present in person at the location of the member of the audience.

In one aspect of the embodiment, the avatar image is displayed holographically at each of the other locations so as to provide a more lifelike appearance of the avatar. In another aspect of the embodiment, the avatar image can be displayed at the primary location in proximity to the DJ so as to draw a contrast between the appearance and movement of the avatar and the appearance and movement of the DJ. In either case, in yet another aspect of the embodiment, an image of a face of a guest in one of the other locations can be superimposed upon a face of the avatar at that location so as to create a novelty experience of the guests at that location.

Optionally, one or more of the other locations can be the cabin of a guest on the vessel. In that event, at least one lighting fixture in the cabin can be remotely activated in coordination with the audio feed. Consequently, despite the guest remaining within the privacy of the cabin, the guest can become immersed in the performance of the DJ as if the guest were present in the primary location with the DJ.

In another embodiment of the invention, a data processing system can be adapted for multi-location DJ presence management. The system includes a host computing platform that has one or more computers, each with memory and one or processing units including one or more processing cores. The system also includes a multi-location DJ presence management module. The module includes computer program instructions that are enabled, while executing in the memory of at least one of the processing units of the host computing platform, to generate an avatar image corresponding to a DJ operating a DJ console at a primary location on a vessel and to transmit from the DJ console, an audio feed produced by the DJ console to multiple other locations on the vessel while displaying the avatar image at each of the other locations. The program instructions further are enabled to animate the displayed avatar image in coordination with movements of the DJ operating the DJ console.

In yet another embodiment of the invention, a computing device includes a non-transitory computer readable storage medium with program instructions stored therein. The instructions are executable by at least one processing core of a processing unit to cause the processing unit to perform a method for multi-location DJ presence management. The method includes generating an avatar image corresponding to a DJ operating a DJ console at a primary location on a vessel and transmitting from the DJ console, an audio feed produced by the DJ console to multiple other locations on the vessel, while also displaying the avatar image at each of the other locations. The method additionally includes animating the displayed avatar image in coordination with movements of the DJ operating the DJ console.

In this way, the technical deficiencies of producing a multi-location performance of a DJ are overcome owing to ability to simulate the live performance of the DJ in each of the different locations of the single venue without relegating the guests in the different locations to viewing the performance as presented on a mere television monitor.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL
VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE
INVENTION

Embodiments of the invention provide for multi-location DJ presence management. In accordance with an embodiment of the invention, an avatar is generated for a DJ delivering a DJ performance in a primary location of a single venue such as a vessel. The audio performance of the DJ can be transmitted for amplification into each of one or more other locations of the single venue concurrently with the amplification of the audio performance in the primary venue. As well, the avatar of the DJ is displayed in each of the other locations, for instance as a hologram and the movement of the avatar can be coordinated with the movement of the DJ so that the avatar becomes, essentially, a live replica of the DJ. In this way, regardless of the location of the single venue, a guest can experience the audio performance of the DJ as if the DJ had been present at that location.

Figure 1:
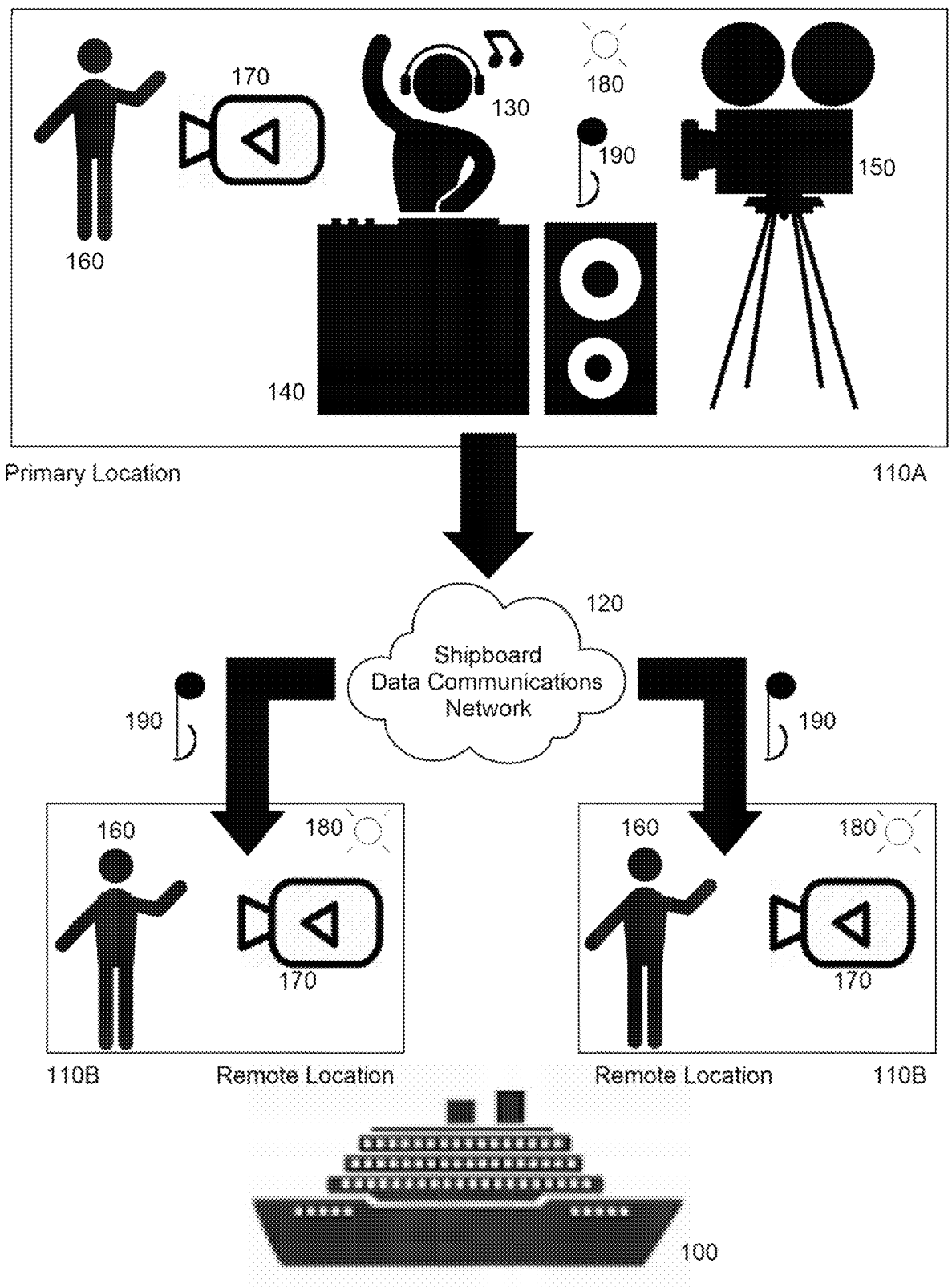
FIG. 1 is a pictorial illustration reflecting different aspects of a process of multi-location DJ presence management.

In illustration of one aspect of the embodiment, FIG. 1 pictorially shows a process of multi-location DJ presence management. As shown in FIG. 1, an onboard operator 130 of a DJ console 140 operators the DJ console 140 to produce music 190 amplified for listening within a primary location 110A of a vessel 100. A video sensor 150 captures video imagery of the operator 130 in order to create an avatar 160 of the operator 130 having movements mapping to movements detected in the captured video imagery.

The music 190 amplified for listening within the primary location 110A can be transmitted over shipboard data communications network 120 to one or more remote locations 110B onboard the vessel 100 including other public entertainment spaces onboard the vessel 100 and even the different private living quarters of the guests of the vessel 100. Of note, the avatar 160 can be transmitted over the network 120 to the different remote locations 110B and projected therein by video projector 170 as an animated video. Optionally, the avatar 160 also can be projected by video projector 170 in the primary location 110A.

In one aspect of the embodiment, the avatar 160 can be projected by the video projector 170 as a three-dimensional hologram. In another aspect of the embodiment, the lighting 180 of both the primary location 110A and the remote locations 110B can be coordinated in color and strobing so that the same lighting effects experienced by guests in the primary location 110A will be experienced by guests in the remote locations 110B. However, as it will be recognized, in all instances, there need be only a single operator 130 operating a single DJ console 140 for guests present not only in the primary location 110A, but also in the remote locations 110B and in all instances, the movement of the operator 130 while operating the DJ console 140 in the primary location 110A will be visible by the guests listening to the performance of the operator 130 in the remote locations 110B.

Figure 2:
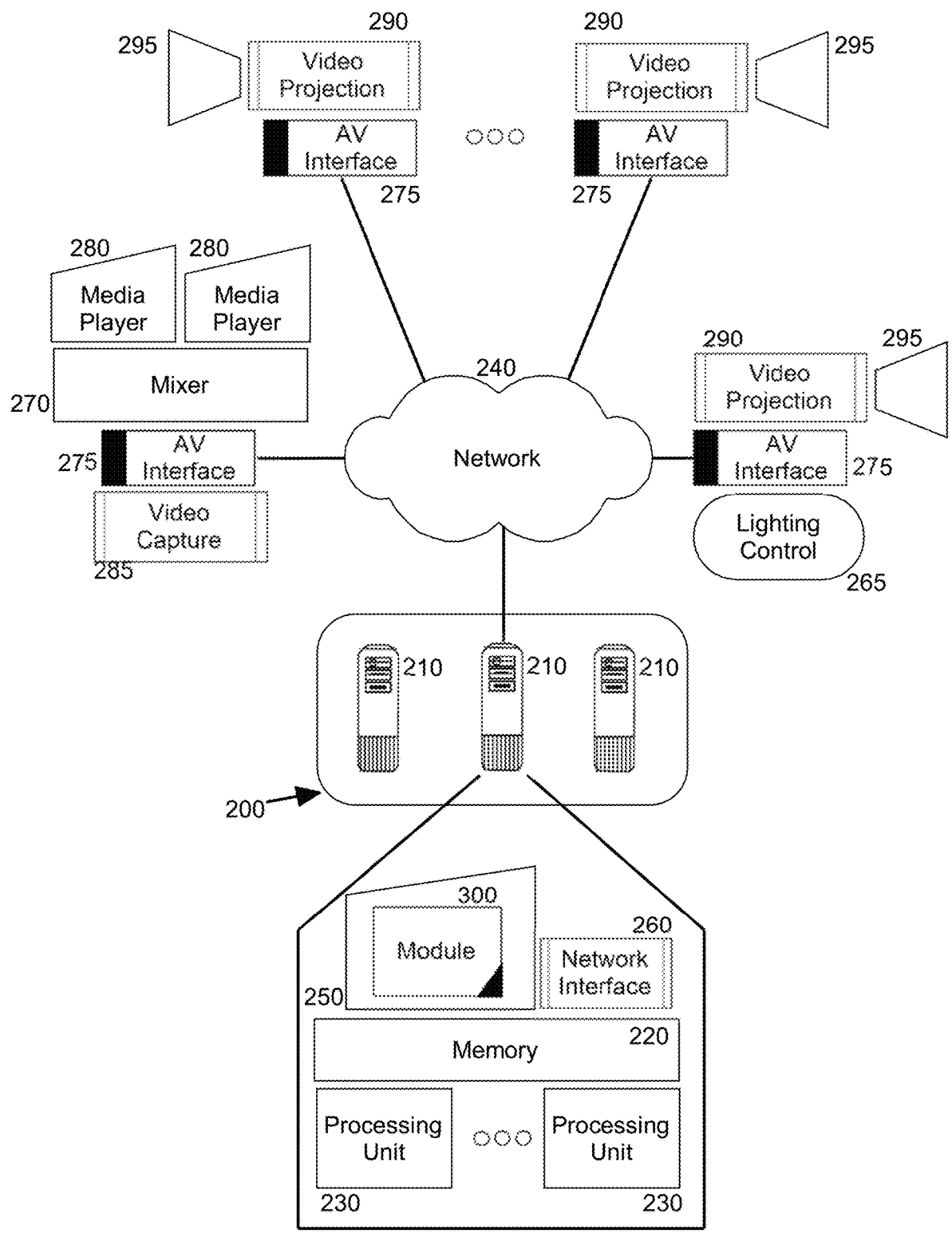
FIG. 2 is a block diagram depicting a data processing system adapted to perform one of the aspects of the process of FIG. 1; and, FIG. 3 is a flow chart illustrating one of the aspects of the process of FIG. 1.

Aspects of the process described in connection with FIG. 1 can be implemented within a data processing system. In further illustration, FIG. 2 schematically shows a data processing system adapted to perform multi-location DJ presence management. In the data processing system illustrated in FIG. 1, a host computing platform 200 is provided. The host computing platform 200 includes one or more computers 210, each with memory 220 and one or more processing units 230. The computers 210 of the host computing platform 200 (only a single computer shown for the purpose of illustrative simplicity) can be co-located within one another and in communication with one another over a local area network, or over a data communications bus, or the computers can be remotely disposed from one another and in communication with one another through network interface 260 over a data communications network 240.

The host computing platform 200 is communicatively coupled over the network 240 to an audio-visual interface 275 of a mixer 270 at a primary location receiving as input the audio output of two or more media players 280, for instance two or more turn tables, or alternatively, two or more solid state storage devices storing thereon, audio files. The audio-visual interface 275 also is coupled to a video capture device 285 such as a camera adapted to capture video imagery of an operator of the mixer 270. The host computing platform 200 yet further is communicatively coupled over the network 240 to a respective audio-visual interface 275 in corresponding remote locations at which each audio-visual interface 275 provides an audio-visual signal received from the mixer 270 to an audio transducer 295 transducing audio portions of the signal into audible music at the corresponding remote locations. The audio-visual interface 275 also provides video portions of the signal to a video projection device 290 for projecting video imagery in the corresponding remote locations. Optionally, lighting control 265 can be provided at at least one of the remote locations.

Notably, a computing device 250 including a non-transitory computer readable storage medium can be included with the data processing system 200 and accessed by the processing units 230 of one or more of the computers 210. The computing device stores 250 thereon or retains therein a program module 300 that includes computer program instructions which when executed by one or more of the processing units 230, performs a programmatically executable process for multi-location DJ presence management. Specifically, the program instructions during execution receive video imagery captured by the video capture device 285 of an operator of the mixer and compute landmark portions of the captured video imagery so as to track the movement of the operator as the operator mixes music on the mixer 270 which is then broadcast over the network 240 for amplification by the audio transducer 295 in the remote locations.

Based upon the tracked movements of the operator, the program instructions animate an avatar which is then transmitted over the network 240 to the audio-visual interface 275 at each remote location for visual projection by respective ones of the video projection device 290. Optionally, the program instructions choreograph the strobing of lights at one or more remote locations through lighting control 265 by transmitting different instructions to the lighting control 265 over the network 240 to activate and deactivate lighting at the remote location in synchronization with the activation and deactivation of lighting at the primary location.

Figure 3:
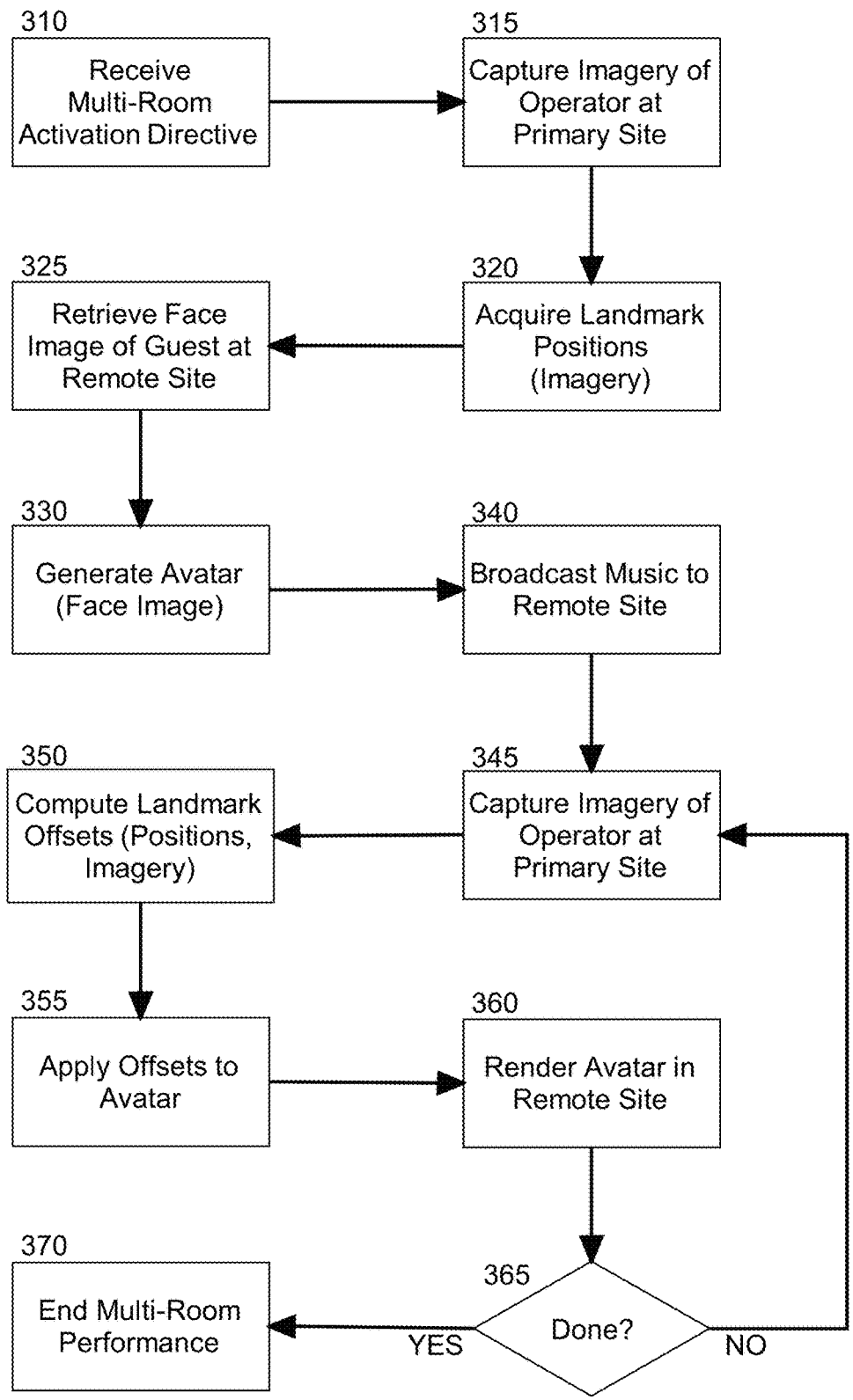

In further illustration of an exemplary operation of the module, FIG. 3 is a flow chart illustrating one of the aspects of the process of FIG. 1. Beginning in block 310, a directive to activate multi-room DJ synchronization is received and in block 315, video imagery of the operator of a DJ console at a primary location is captured in order to identify landmark positions on the video imagery, such as a location of a facial feature, the hands, elbows, shoulders, hips, knees and feet. The identification of the landmark positions can be performed by submitting the video imagery to a convolutional neural network trained to segment imagery of the human form and to identify landmark features of the human form. In block 325, a facial image of a guest in a remote location can be captured, for instance by a camera present in the remote location or based upon a pre-stored image of a guest in the remote location known to be present in the remote location. Then, in block 330, an avatar image is generated including as the face portion of the avatar, the facial image of the guest.

Thereafter, in block 340 music mixed by the operator at the DJ console is transmitted from the primary location to the remote location for amplification at the remote location in synchronization with the amplification of the music at the primary location. Concurrently, in block 345 additional imagery of the operator is captured at the primary location and in block 350, an offset position of each of the landmark positions is determined in the additional imagery so as to measure a displacement of the landmark positions as between the initial submitted video imagery and the additional imagery. The measured displacement is then applied to corresponding features of the avatar so as to coordinate the movement of the avatar with the movement of the operator. Then, in block 360 the avatar is rendered in the remote site. In decision block 365, if the multi-room performance is selected to discontinue, then in block 370 the performance completes. But otherwise, the process repeats through block 345 with the capture of new imagery of the operator.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for multi-location DJ presence management comprising:
   generating an avatar image corresponding to a DJ operating a DJ console at a primary location on a vessel;
   transmitting from the DJ console, an audio feed produced by the DJ console to multiple other locations on the vessel;
   capturing an image of a face of a guest on the vessel present at one of the other locations on the vessel and superimposing the captured image of the face of the guest on a face portion of the avatar image;
   displaying the avatar image with the superimposed captured image of the face of the guest at each of the other locations; and,
   animating the displayed avatar image in coordination with movements of the DJ operating the DJ console.

2. The method of claim 1, wherein the avatar image is displayed holographically at each of the other locations.

3. The method of claim 1, further comprising displaying the avatar image at the primary location in proximity to the DJ.

4. The method of claim 1, wherein one of the other locations is a cabin of a guest on the vessel.

5. The method of claim 4, further comprising remotely activating at least one lighting fixture in the cabin in coordination with the audio feed.

6. A data processing system adapted for multi-location DJ presence management, the system comprising:
   a host computing platform comprising one or more computers, each with memory and one or more processing units including one or more processing cores; and,
   a multi-location DJ presence management module comprising computer program instructions enabled while executing in the memory of at least one of the one or more processing units of the host computing platform to perform:
   generating an avatar image corresponding to a DJ operating a DJ console at a primary location on a vessel;
   transmitting from the DJ console, an audio feed produced by the DJ console to multiple other locations on the vessel;
   capturing an image of a face of a guest on the vessel present at one of the other locations on the vessel and superimposing the captured image of the face of the guest on a face portion of the avatar image;
   displaying the avatar image with the superimposed captured image of the face of the guest at each of the other locations; and,
   animating the displayed avatar image in coordination with movements of the DJ operating the DJ console.

7. The system of claim 6, wherein the avatar image is displayed holographically at each of the other locations.

8. The system of claim 6, further comprising displaying the avatar image at the primary location in proximity to the DJ.

9. The system of claim 6, wherein one of the other locations is a cabin of a guest on the vessel.

10. The system of claim 9, further comprising remotely activating at least one lighting fixture in the cabin in coordination with the audio feed.

11. A computing device comprising a non-transitory computer readable storage medium having program instructions stored therein, the instructions being executable by at least one processing core of a processing unit to cause the processing unit to perform a method for multi-location DJ presence management, the method including:
    generating an avatar image corresponding to a DJ operating a DJ console at a primary location on a vessel;
    transmitting from the DJ console, an audio feed produced by the DJ console to multiple other locations on the vessel;
    capturing an image of a face of a guest on the vessel present at one of the other locations on the vessel and superimposing the captured image of the face of the guest on a face portion of the avatar image;
    displaying the avatar image with the superimposed captured image of the face of the guest at each of the other locations; and,
    animating the displayed avatar image in coordination with movements of the DJ operating the DJ console.

12. The computing device of claim 11, wherein the avatar image is displayed holographically at each of the other locations.

13. The computing device of claim 11, wherein the method further comprises displaying the avatar image at the primary location in proximity to the DJ.

14. The computing device of claim 11, wherein one of the other locations is a cabin of a guest on the vessel.

15. The computing device of claim 14, wherein the method further comprises remotely activating at least one lighting fixture in the cabin in coordination with the audio feed.

* * * * *